April 30, 1963 TOSHIO FUJII 3,087,197
PLANT FOR CONTINUOUSLY POLYMERIZING SYNTHETIC
RESIN PLATES BY USING GLASS MOLDS
Filed Dec. 29, 1959 7 Sheets-Sheet 1

INVENTOR:
TOSHIO FUJII
BY
Richardson, David and Nordon
ATTYS.

April 30, 1963  TOSHIO FUJII  3,087,197
PLANT FOR CONTINUOUSLY POLYMERIZING SYNTHETIC
RESIN PLATES BY USING GLASS MOLDS
Filed Dec. 29, 1959  7 Sheets-Sheet 2

INVENTOR:
TOSHIO FUJII
BY
Richardson, David and Nordon
ATTYS.

Fig.10

United States Patent Office 3,087,197
Patented Apr. 30, 1963

3,087,197
PLANT FOR CONTINUOUSLY POLYMERIZING SYNTHETIC RESIN PLATES BY USING GLASS MOLDS
Toshio Fujii, Hiroshimaken, Japan, assignor to Mitsubishi Rayon Co., Ltd., Tokyo, Japan
Filed Dec. 29, 1959, Ser. No. 862,634
4 Claims. (Cl. 18—4)

This invention relates to a plant for producing synthetic resin plates wherein synthetic resin plates are heated and polymerized by means of glass molds or more particularly to a plant for continuously and efficiently producing synthetic resin plates by a combination of polymerizing apparatus and conveying equipment attached thereto.

For the sake of this explanation, a mold of two glass plates into which a synthetic resin monomer or semi-polymer is poured and sealed on the periphery with a gasket by means of clamps will be hereinafter called a cell.

A main object of the present invention is to provide a plant for efficiently and continuously producing synthetic resin plates of good quality wherein a polymerizing temperature is regulated to a desired one and polymerization of synthetic resin of a cell conveyed automatically is uniformly effected.

A further object of the present invention is to provide a plant wherein the cell polymerization in the former step of the polymerization process including a step in which a polymerization proceeds quickly with high heat generation is uniformly effected by regulated cell temperatures utilizing hot water of the high coefficient of heat transmission and the large thermal capacity, and the cell polymerization in the latter step of the polymerization process necessitating a high temperature of more than 100° C. is completely effected utilizing hot air and cells are conveyed circularly.

The above stated and other objects will more clearly appear from the specification hereinafter to follow, reference being had to the accompanying drawings in which the invention is illustrated in several embodiments.

In the drawings.

Similar characters of reference indicate corresponding parts throughout the several views.

Figure 1:
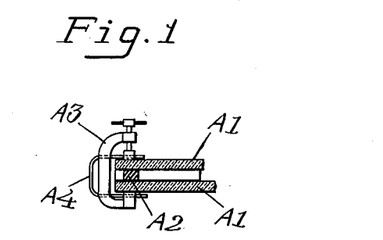
FIGURE 1 is a fragmentary section view of a cell used in the present invention.

Referring to FIGURE 1, in a cell A, a synthetic resin monomer or semi-polymer is poured in between glass molds A1 and A1 having a gasket A2 interposed between them, then said glass molds are sealed with clamps A3 and a protecting and guiding cover A4 is attached thereto.

Figure 2:
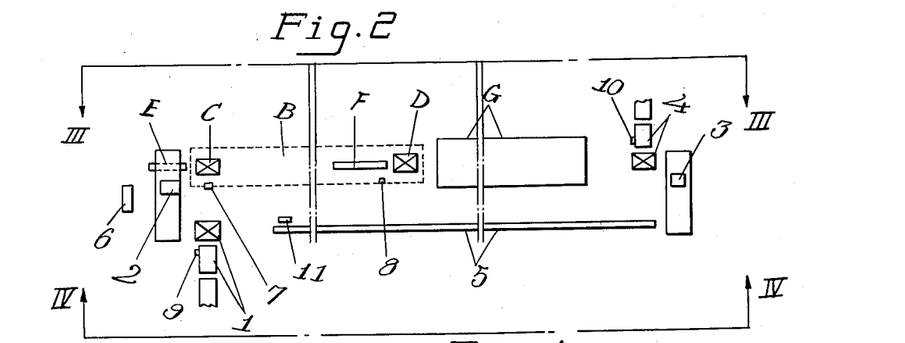
FIGURE 2 is a diagrammatical plan view of an apparatus according to the present invention.
Figure 3A:
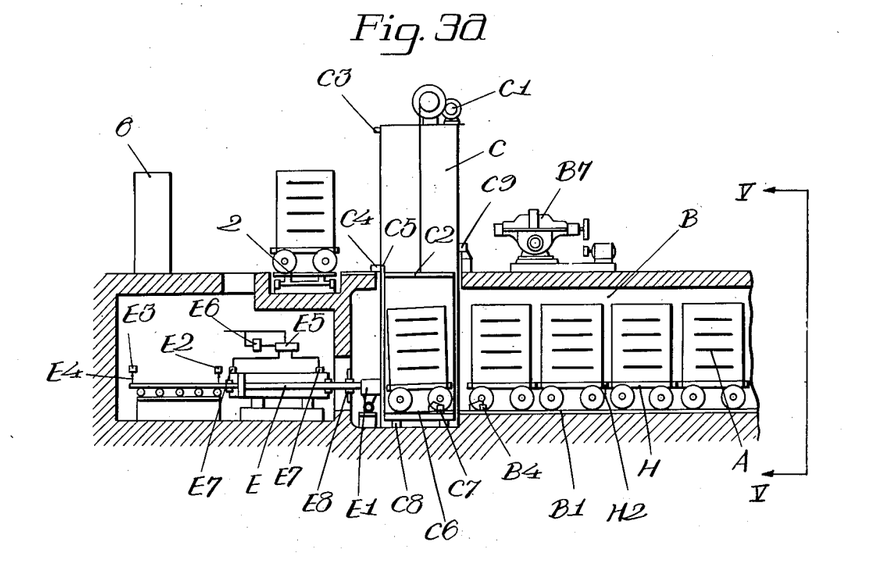
FIGURES 3a, 3b and 3c are longitudinal section views taken along sections of the line III—III of FIGURE 2.
Figure 3B:
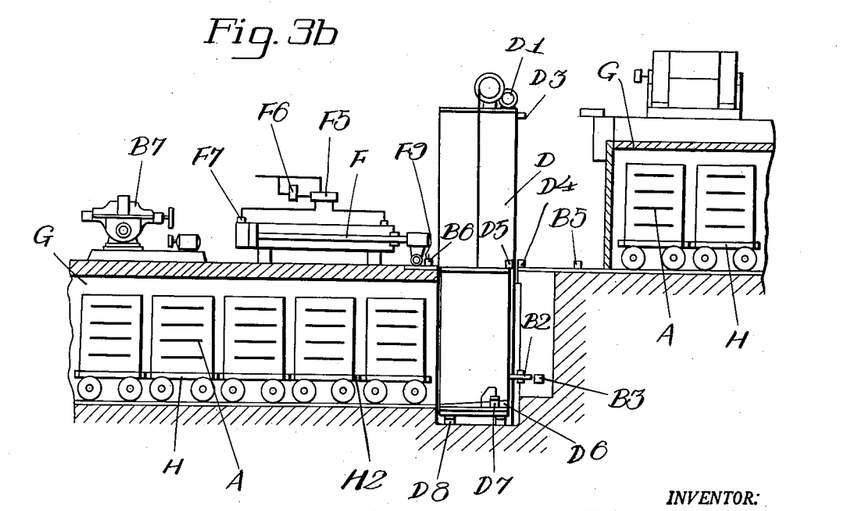
Figure 3C:
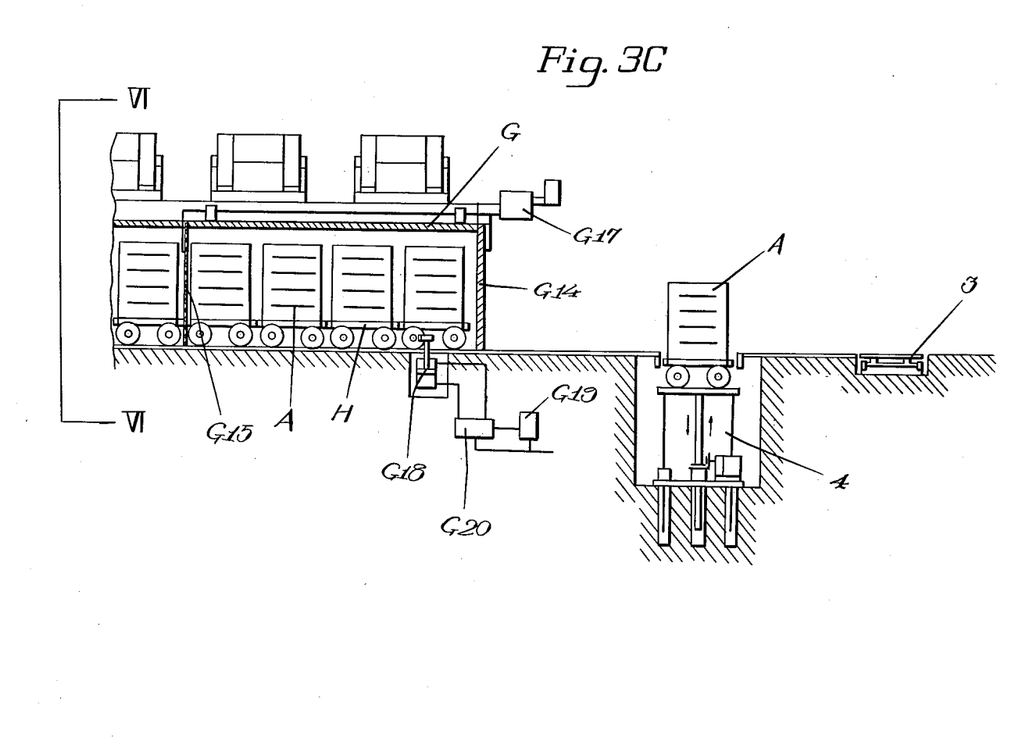
Figure 4:
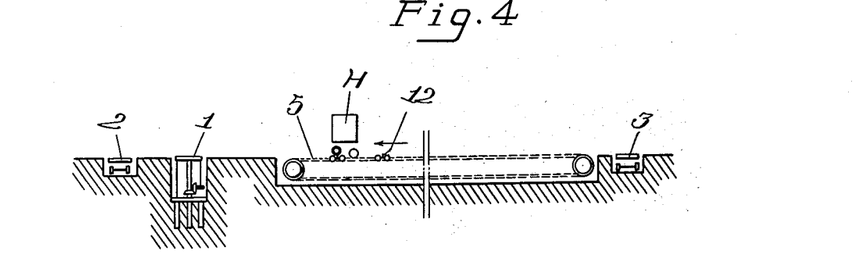
FIGURE 4 is a longitudinal section view taken on the line IV—IV of FIGURE 2.

The arrangement of the present invention is schematically shown in FIGURE 2 and comprises a cell loading device 1 provided with a conveyor and an elevating device, truck traversers 2 and 3, a water bath type polymerizing apparatus B, elevators C and D for dipping and taking out a truck, pushers E and F, an air bath type polymerizing apparatus G, a cell unloading device 4 and a chain conveyer 5 for conveying an empty truck, a control board 6 for controlling the whole operation and operating boards 7, 8, 9, 10 and 11 being provided as controlling means.

The cells A fed by the cell loading device 1 are loaded in several steps at equal intervals so as to be uniformly heated from both surfaces of the cell in a rack H1 on a truck H and the truck is carried by the traverser 2 to the dipping elevator C. The truck is then kept in a cage C2 of the dipping elevator C which is lowered and dipped into the polymerizing apparatus B by a motor C1.

The raised and lowered positions of the cage C2 are so made as to be positively defined by limit switches C3 and C4 and a contactor C5 attached to the upper lid of the cage C2.

In lowering the dipping elevator C, when the cells are inclined to some extent, they will sink down in the hot water all the more easily. It is therefore preferable to incline the rails C6 in the cage C2. A stopper C7 is provided to prevent the truck from moving in such case. The rails and stopper are set on a stand C8. A limit switch C9 engages with a push bar H2 of the truck kept in the cage C2 to serve for safe operation. The whole length of the truck can be regulated by the push bar H2.

When the completion of the dipping of the dipping elevator C into the hot water is confirmed (at the same time the elevator D for taking out the truck has lowered), the pusher E is operated by the timer of the control board 6 so that its head part E1 may be pressed against the push bar H2 of the truck H to advance the truck. Limit switches E2 and E3 defining the advance and retreat, a contactor E4, a pilot valve E5, an electromagnetic valve E6, a regulating valve E7 and a gland packing E8 are provided as fittings attached to the pusher E so that the advance and retreat may be effected.

When many trucks in the hot water polymerizing apparatus B are advanced on the rails B1 by the pusher E, the limit switch E2 will operate and the push bar H2 of the foremost truck will come into contact with a stopper B2 provided on the outlet side and the limit switch B3 is operated, so that the electromagnetic valve E6 will be demagnetized, the pusher E will retreat and one stroke for conveying the trucks will be completed. The truck will be stopped by a stopper B4.

When the foremost truck is confirmed to have been put in the delivering elevator D, the motor D1 is operated so that the elevator D may rise and the truck is taken out of the apparatus. In such case, the dipping elevator C will simultaneously come out of the apparatus. The parts of the delivering elevator D correspond to those of the dipping elevator C. The limit switches D3 and D4 and the contactor D5 will operate to positively define raising and lowering.

When a predetermined time has elapsed after the elevator D stopped, the doors of the air bath type polymerizing apparatus G will be opened by a timer provided in the control board 6. Then the pusher F will begin to advance, and will carry the truck to a predetermined position, and at the same time push out of the apparatus the truck located at the rearmost end and loaded with the completely polymerized cells and will retreat.

When the retreat of the pusher F is completed, the doors of the air bath type polymerizing apparatus are all closed. When the truck previously located just before the dipping elevator C and loaded with the cells is confirmed to have been put in the dipping elevator, these elevators are simultaneously lowered. It will stop at a predetermined position in the polymerizing apparatus B so that the truck may be conveyed. The time required is 10 to 15 minutes.

The parts of the pusher F correspond to those of the pusher E except that a contactor F9 is provided in place of the contactor E4. The limit switches B5 and B6 will operate to define the advance and retreat of the pusher F.

Thus the trucks are correctly conveyed at specified time intervals by the elevators C and D and pushers E and F.

When the truck is taken out of the polymerizing apparatus, the cells will be taken out by the cell unloading device 4 and the empty truck will be sent to one end of the chain conveyor 5 by the truck traverser 3, and will be hung on a carrying claw 12 thereof to be returned to the cell loading device 1.

The heating and polymerization by hot water (FIGURE 5) will now be explained. Hot water is fed by the pump B7 through a distributing pipe B8, into a partition chamber B9 is hence passed through perforated plates B10 and B11, flows uniformly into a polymerizing chamber B12 in which are located trucks, and passes on the surfaces of the glass molds in a uniform stream (at a speed of about 0.5 to 3 m./min.). Meanwhile the cells are uniformly heated without unevenness as to produce uniform polymerization. The hot water which has passed on the surfaces of the glass molds comes to a partition chamber B15 on the other side through perforated plates B13 and B14, then returns to the pump B7 through a water suction pipe B16. This is repeated so that the hot water circulates within the polymerizing apparatus.

Figure 5:
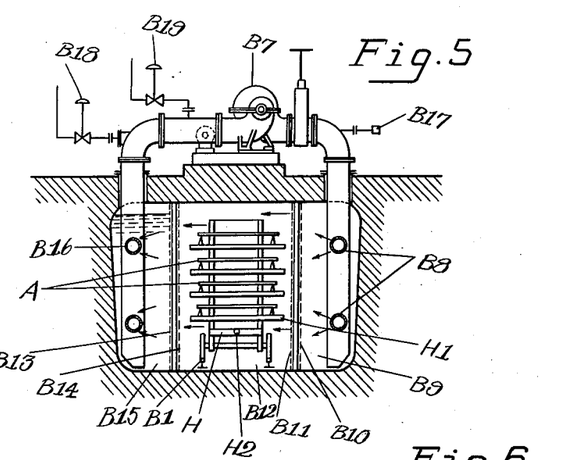
FIGURES 5 and 6 are cross section views taken on the line V—V of FIGURE 3a and the line VI—VI of FIGURE 3c respectively.

The temperature of the hot water is measured by a thermometer B17 and is adjusted to a predetermined value by properly opening and closing a steam controlling valve B18 and a water controlling valve B19 by means of a proper automatic temperature adjusting device provided individually. Further, if a set of the pump and the temperature adjusting device (which is referred to as "unit") is provided at intervals of an integral number, for example, 3 or 4 of trucks, the temperatures of the hot water will be able to be automatically adjusted as required to predetermined value with a temperature difference of several degrees in temperatures of adjacent hot water in each unit.

In general, every temperature rise of 10° C., the polymerizing velocity rate of a synthetic resin will increase approximately twice. From this fact, the temperature difference of hot water in each unit, when properly kept in response to the amount of the catalyst added to the monomer and the thickness of the resin plate, will be able to properly control the polymerizing velocity so as to increase the efficiency.

Figure 6:
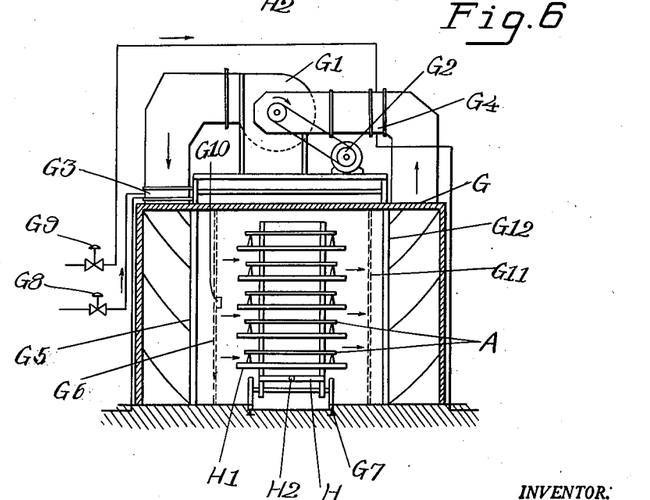

In a hot air polymerizing apparatus G, FIGURE 6, each unit is integrally connected and comprises a hot air circulating fan G1, a motor G2, a steam heater G3, a cooler G4, a perforated plate G5 for passing uniformly a hot air and a metal screen G6. Rails G7 for trucks are laid in the apparatus. Stream and water control valves G8 and G9 and a hot air temperature measuring end part G10 are provided as fittings attached to the apparatus.

With reference to the circulating action of the hot air, the temperature of the hot air is measured at the hot air temperature measuring end part G10 and is adjusted by means of the steam heater G3 or the cooler G4 by properly opening and closing the control valves G8 and G9 by an automatic temperature adjusting device provided individually. The hot air flows uniformly through the perforated plate G5 and the metal screen G6 by means of the fan G1, then uniformly heats (or, in some case, cools) the cells carried on the rack H1 of the trucks located within the apparatus and returns to the fan through a metal screen G11 and a perforated plate G12 on the other side.

In each unit, an integral number of trucks are kept and a uniform stream of the hot air at an average velocity of about 2 m./sec. (the variation of the wind velocity being within ±0.25 m./sec.) is circulated. The hot air at different temperatures as required in the adjacent units and in each step can be circulated. The intermediate temperature range existing in the boundary between units can be controlled to such degree as to avoid any difficulty in actual practice.

Therefore, the cells can be polymerized by the uniformly flowing hot air at predetermined temperatures in the respective units. Thus continuous polymerization can be carried out at a high efficiency by using high velocity hot air.

The point of carrying out the former step polymerization by the water bath type and the later step polymerization by the air bath type will be explained in details.

The polymerizing process for a synthetic resin or specially an acrylic resin can be roughly divided into four steps, namely the first step wherein the polymerization proceeds gradually, the second step wherein the polymerization proceeds quickly with high heat generation, the third step wherein the polymerization takes place at a higher temperature and the fourth step wherein the molds are removed by utilizing the difference between the coefficient of linear expansion of the glass mold and that of the resin plate.

The step requiring the utmost attention is the second step. If this step is to be carried out by the air bath type apparatus wherein the hot air is used, even at a proper wind velocity in a uniform stream, due to inherent properties of air, that is the low coefficient of heat transmission and the small thermal capacity, the unevenness of the polymerization proceeding velocity by such change of the quality of a syrup as that of the amount of impurities contained slightly in the semi-polymer syrup and that of the amount of dissolved gas such as oxygen dissolved in the syrup will not be able to be well disposed and the safety factor for the polymerization will be low.

When the thickness of the resin plate is larger than 8 mm., unfavorable conditions that the amount of heat generation will become larger and the thermal conductivity of the glass molds themselves is low, will be further added, so that a lower temperature and a longer time will be required. Thus, it is very disadvantageous and is not economical to carry out the second step by the air bath type polymerization.

From such view-point, the former step of the polymerization is carried out by the water bath type apparatus. Thus, due to the large thermal capacity and high coefficient of heat transmission of hot water, in the first step, the cells will be heated uniformly and quickly and, in the second step, even the large amount of heat generation by the polymerization can be uniformly and quickly removed by the hot water circulating in a uniformly stream, so that no temperature fluctuation will appear and the cells will be kept at a uniform temperature met to the treating conditions. Therefore, the fluctuation of the polymerization proceeding velocity by the change of the quality of the syrup can be eliminated and the safety factor for the polymerization is so high that the apparatus is economical even with resin plates about 8 to 30 mm. thick and the industrial mass production is possible.

As regards the third step, with the water bath type apparatus, the maximum temperature of the circulating hot water is about 90° C. It takes a long time and is not economical to carry out the later step polymerization at a temperature 90° C. or thereabouts. Further, the circulation of the hot water above 100° C. and the use of steam require high pressure means and are not industrial.

From such view-point, in the third step wherein a high temperature is required, the air bath type apparatus wherein hot air is used, is advantageous and the polymerization is carried out by using the hot air in a uniform stream at above 100° C., said air being circulated at a proper wind velocity.

In the next fourth step, the molds are to be removed by utilizing the difference between the coefficient of linear expansion of the glass molds and that of the resin plate by increasing the temperature difference from the third step. Therefore, it is advantageous to carry out the fourth step just after the third step. Favorable results have been obtained by continuously removing the molds in the low temperature parts in several units provided at the rear end of the air bath type polymerizing apparatus.

In the case of acrylic resin plates 2 to 4 mm. thick:

Water bath, 1st step, 70 to 55 (° C.), 1 (h.)
Water bath, 2nd step, 65 to 50 (° C.), 3 (h.)
Air bath, 3rd step, 100 to 145 (° C.), 3 (h.)
Air bath, 4th step, 60 to 30 (° C.), 0.5 (h.)

In the case of styrol resin plates 2 to 3 mm. thick:

Water bath, 1st step, 45 to 55 (° C.), 30 to 40 (h.)
Water bath, 2nd step, 40 to 50 (° C.), 20 to 30 (h.)
Air bath, 3rd step, 85 to 100 (° C.), 4 to 6 (h.)
Air bath, 4th step, 50 to 30 (° C.), 1 to 2 (h.)

According to the present invention, the cells are automatically conveyed, the polymerization in the former step is carried out uniformly and economically by utilizing the high coefficient of heat transmission and the large thermal capacity of the hot water in the water bath type polymerizing apparatus, the polymerization in the latter step is carried out at a higher temperature in the air bath type polymerizing apparatus and the trucks loaded with the cells are conveyed circularly.

Figure 7:
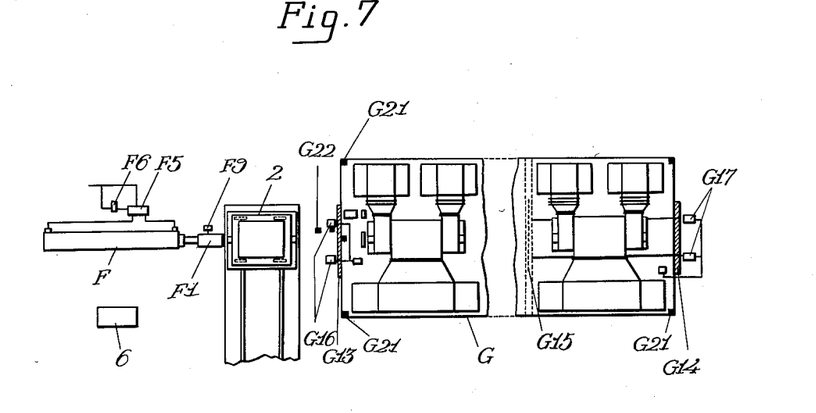
FIGURES 7 and 8 show in a plan view and a longitudinal elevation view another embodiment of the present invention.
Figure 8:
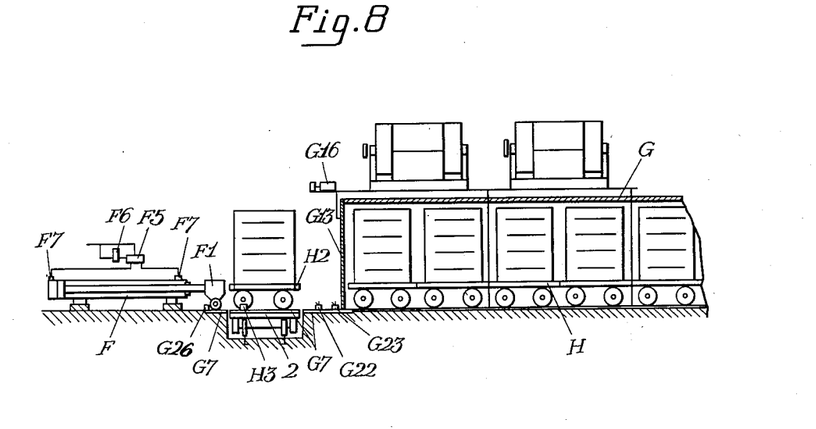

FIGURES 7 and 8 show an apparatus for polymerizing cells by hot air according to the present invention, one of the pushers, water bath type polymerizing apparatus and elevators in the above embodiment being omitted.

A truck H on a traverser 2 with stoppers H3 is carried to a pusher F. A timer of a control board 6 is operated at every predetermined time to begin conveying of the truck to a polymerizing apparatus.

First, automatic doors G13 and G14 and an intermediate door G15 are opened by door engine G16 and G17, and at the same time an electromagnetic valve G19 and a pilot valve G20 is operated to lower a stopper G18.

When opening of the automatic doors are confirmed by a limit switch G21, a pilot valve F5 is changed to begin the advance of the pusher, the truck H is pushed into the apparatus along rails G7, all the trucks are advanced with one stroke and one truck located at the rearmost end is pushed out of the apparatus. It is effected by contacting a limit switch G22 with a contactor F9 of a pusher head F1 to define the advancing position of said pusher. Thereby an electromagnetic valve G19 of the stopper G18 and a pilot valve G20 are operated to raise the stopper G18 and stop the advance of the trucks. At the same time the contactor F9 contacts with a limit switch G23 and a pilot valve F5 is changed to begin the retreat of the pusher. When the retreat is confirmed by contact of the contactor F9 and the limit switch G24, the doors G13, G14 and G15 are closed and thus conveying of the trucks is completed. The time required is about 20 min.

In order to maintain a large temperature difference between the third step and the fourth step of the polymerization the intermediate door G15 is provided. The pusher is provided with a regulating valve F7 to regulate the speed of the pusher to 2 to 4 m./min.

In the case of acrylic resin plates 2 to 3 mm. thick:

1st step, 70 to 55 (° C.), 1 to 2 (h.)
2nd step, 65 to 45 (° C.), 5 to 7 (h.)
3rd step, 100 to 145 (° C.), 2 to 4 (h.)
4th step, 60 to 30 (° C.), 1 (h.)

In the case of styrol resin plates 2 to 3 mm. thick:

1st step, 40 to 55 (° C.), 30 to 40 (h.)
2nd step, 35 to 45 (° C.), 30 to 40 (h.)
3rd step, 85 to 100 (° C.), 4 to 6 (h.)
4th step, 50 to 30 (° C.), 1 to 2 (h.)

Figure 9:
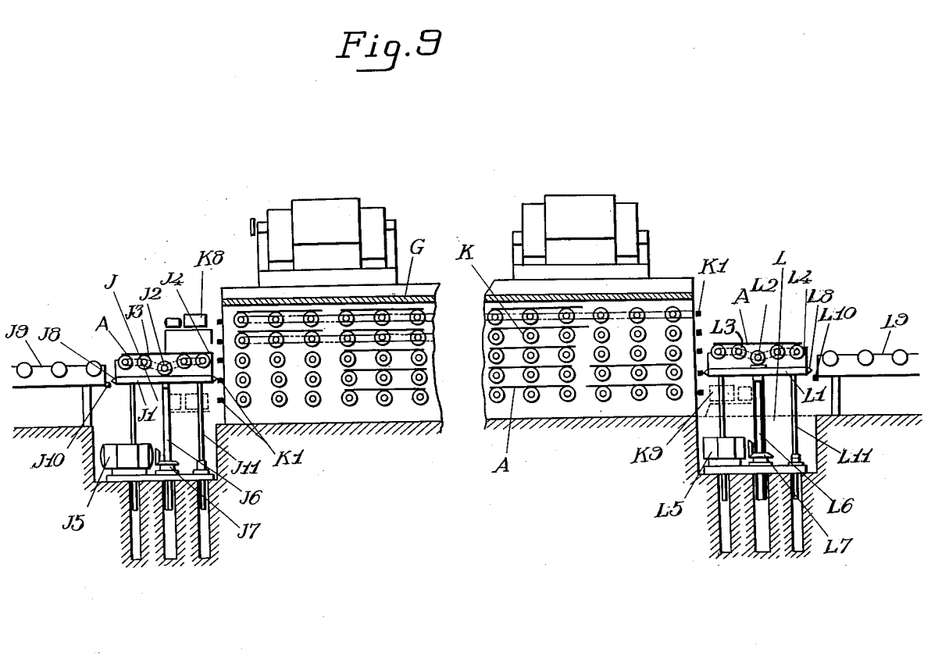
FIGURES 9 and 10 show in a plan view and a longitudinal elevation view a still another embodiment of the present invention.
Figure 10:
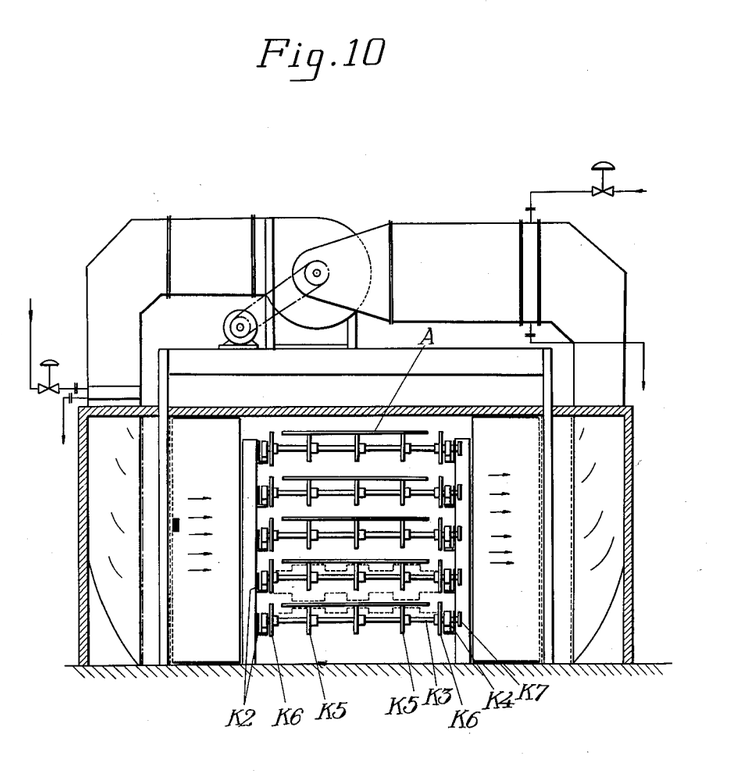

FIGURES 9 and 10 show another embodiment comprising a cell feeding device J, a hot air type polymerizing apparatus G, roller conveyers K for conveying cells, and a cell taking-out device L.

The cell feeding device J comprises a table J1 for feeding cells and a table driving device. The table J1 is provided with several rollers J3 driven through a chain by a motor J2 and a limit switch J4 which operates to stop automatically the motor after confirming the location of a cell on the table. The table driving device operates to raise or lower the table to a desired position transmitting the revolution of the motor J5 to a nut J7 with a bevel gear meshing with a screw rod J6. The revolution of the motor J5 is automatically stopped by engaging a contactor J8 with a limit switch J10 of a conveyer J9 and a limit switch K1 of each step of the roller conveyers K and the table is located at each step of the roller conveyers. On the corner of the table are provided guide rods J11 which prevent the table from vibrating.

The roller conveyers K are provided in the polymerizing apparatus, and comprise common frames K2, roller shafts K3, bearings K4, disc shaped rollers K5 for conveying cells, guide rollers K6 of cells and sprocket wheel K7 for transmitting revolution. The speeds of the conveyers are made the same speed in all steps or desired speeds respectively.

The rear end part of the roller conveyer driven by the motor K8 is alternatively driven by a further motor K9 so that cells are taken out of the roller conveyers, the speed of the rollers L3 of the table L1 in the cell taking-out device L being equal to that of the roller conveyers. Thus the taking-out is efficiently completed.

Parts of the cell taking-out device L corresponds to those of the cell feeding device J, the taking-out changing the feeding.

The polymerizing apparatus G is similar to the above-mentioned embodiment.

The cells A conveyed by the cell feeding conveyer J9 are loaded on several steps of the roller conveyer K in the polymerizing apparatus G. The motor J5 is driven regularly or reversely and stopped by the contact of the limit switch J10 and the contactor J8 of the table so that the table J1 is stopped at the height of the conveyer J9. The cell conveyed by conveyer J9 is delivered to the table, contacts at the end with the limit switch and opens the switch of the motor J2 to stop the revolution of the rollers J3. Then the motor J5 is rotated to raise or lower the table. When the contactor J8 contacts the limit switch K1 of the desired step, the switch of the motor J5 is opened to stop the table at the desired step of the roller conveyer and a further switch operates to rotate the motor J2 and the rollers J3. Thus loading on one step is effected and similarly loading on the other steps are effected.

The cells fed continuously into the polymerizing apparatus are heated and polymerized by the hot air, the guide rollers K6 and the cover A4 preventing the cells from swinging. Normally the roller conveyers are driven at the same speed but may be driven at different speeds in every step when the plates are different in thickness or the plates which are different in polymerizing conditions are polymerized simultaneously.

The polymerized cells are taken out of the polymerizing apparatus by the cell taking-out device L reversing the feeding operation.

What I claim is:

1. A plant for continuously mass producing synthetic resin plates by using glass molds, comprising: a plurality of trucks, supports on said trucks for holding a plurality of said molds in spaced relationship, a hot water bath, means for moving said trucks serially into, through and from said hot water bath, a plurality of heating and circulating units associated with said hot water bath and constructed and arranged to accurately maintain desired temperature differentials in predetermined treatment zones along said hot water bath, said units including inlet and outlet conduits respectively coupled to opposite sides of said hot water bath and baffle means disposed along opposite sides of said hot water bath for producing uniform transverse flow of hot water through said bath between said conduits, said baffle means comprising vertically disposed perforated partitions defining inlet and outlet hot water chambers laterally of said hot water bath respectively on each side thereof, whereby said molds will be subjected to different accurately controlled treatment temperatures for preselected time periods as said trucks move serially through said hot water bath, a hot air treatment chamber, means for moving said trucks serially from said hot water bath into, through and from said hot air treatment chamber, and a plurality of air heating and circulating units associated with said chamber for accurately controlling the treatment temperatures in predetermined treatment zones along said chamber, whereby treatment temperatures above 100° C. may be applied to said molds after leaving said water bath and relative lower mold-releasing temperatures may be applied thereto thereafter as desired.

2. Apparatus according to claim 1 additionally comprising means for loading said molds onto said trucks.

3. Apparatus according to claim 1 additionally comprising elevators for lowering and raising said trucks into and from said water bath.

4. Apparatus according to claim 1 additionally comprising conveyor means for returning trucks from the discharge end of said chamber to the input end of said water bath for reloading thereof.

References Cited in the file of this patent

UNITED STATES PATENTS

| | | |
|---|---|---|
| 1,502,205 | McGuire | July 22, 1924 |
| 1,611,162 | Dykes | Dec. 21, 1926 |
| 1,656,874 | Snyder | Jan. 17, 1928 |
| 1,958,422 | Dinzl | May 15, 1934 |
| 2,347,117 | Lukenberger et al. | Apr. 18, 1944 |
| 2,383,047 | Dreyfus | Aug. 21, 1945 |
| 2,542,386 | Beattie | Feb. 20, 1951 |
| 2,579,596 | Minter et al. | Dec. 25, 1951 |

FOREIGN PATENTS

| | | |
|---|---|---|
| 749,466 | Great Britain | May 23, 1956 |
| 587,635 | Canada | Nov. 24, 1959 |